Figure 1:
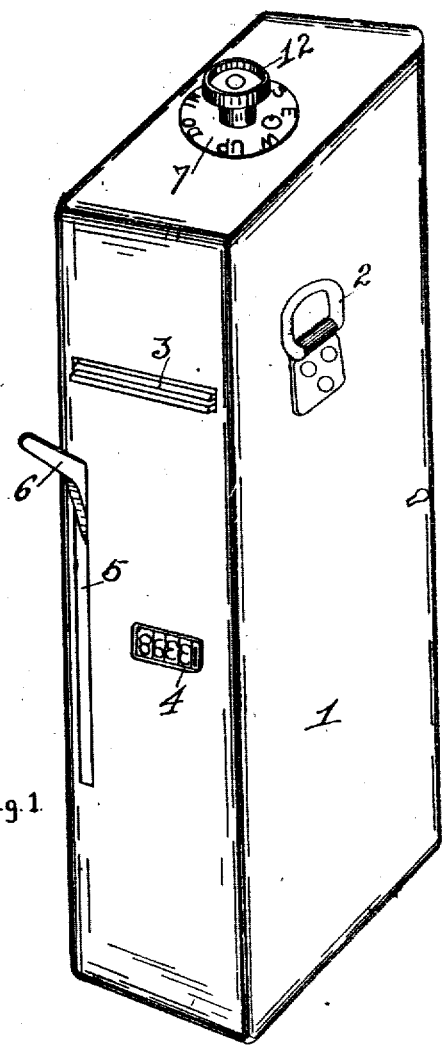

No. 779,557. PATENTED JAN. 10, 1905.
J. F. OHMER & E. H. BRIDENBAUGH.
TICKET ISSUING AND RECORDING MACHINE.
APPLICATION FILED MAR. 25, 1904.

6 SHEETS—SHEET 1.

Witnesses
J. Fred Hemberger.
C. M. Theobald.

Jno. F. Ohmer.
Elmer H. Bridenbaugh.
Inventors.

By R. J. McCarty.
Attorney

No. 779,557. PATENTED JAN. 10, 1905.
J. F. OHMER & E. H. BRIDENBAUGH.
TICKET ISSUING AND RECORDING MACHINE.
APPLICATION FILED MAR. 25, 1904.

6 SHEETS—SHEET 2.

Witnesses
J. Fred Hemberger
C. M. Theobald

Inventors
Jno. F. Ohmer
Elmer H. Bridenbaugh
By R. J. McCarty
Attorney

No. 779,557. PATENTED JAN. 10, 1905.
J. F. OHMER & E. H. BRIDENBAUGH.
TICKET ISSUING AND RECORDING MACHINE.
APPLICATION FILED MAR. 25, 1904.
6 SHEETS—SHEET 4.
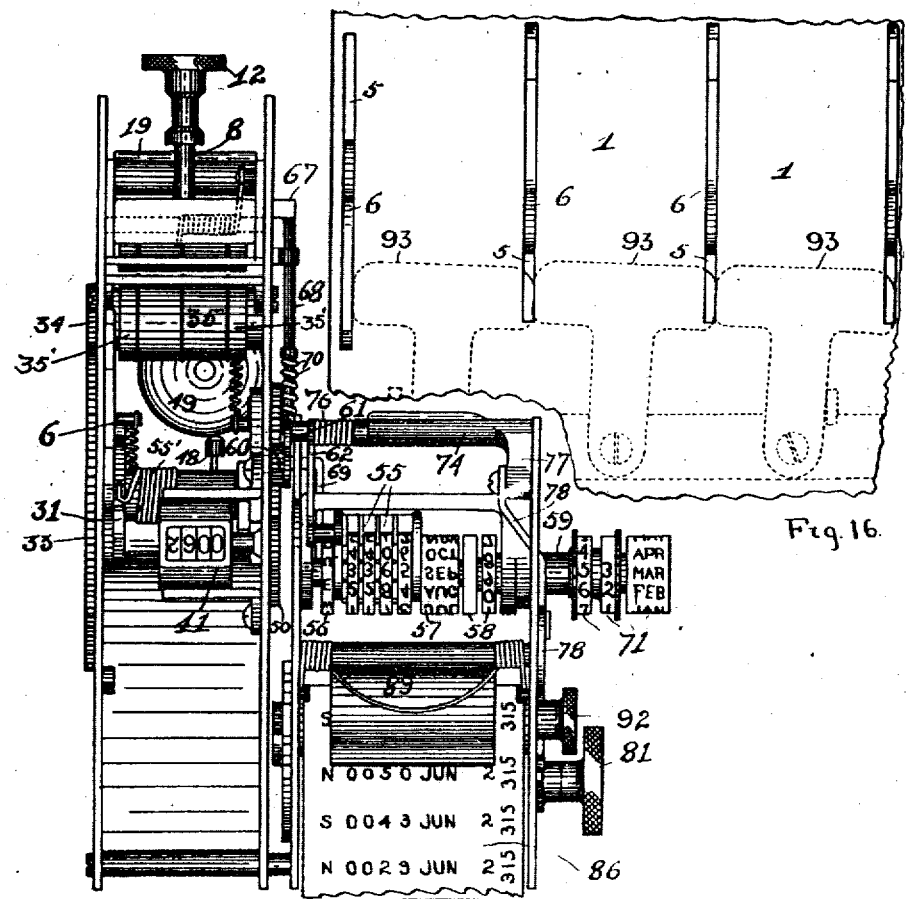
Fig. 16.
Fig. 9.
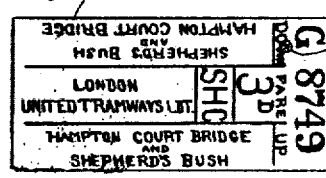
Fig. 15.
Fig. 10.
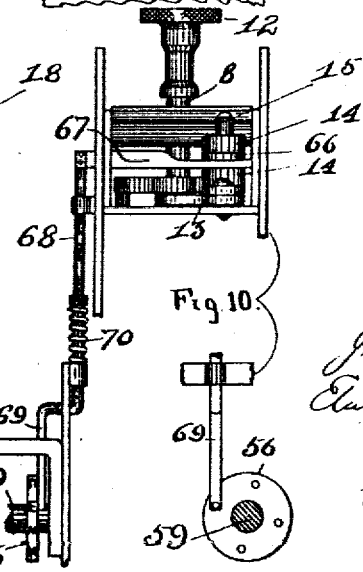
Witnesses
J. Fred Hamburger
C. M. Theobald
Jno. F. Ohmer.
Elmer H. Bridenbaugh.
Inventors
By K. J. McCarty
Attorney No. 779,557.
PATENTED JAN. 10, 1905.
J. F. OHMER & E. H. BRIDENBAUGH.
TICKET ISSUING AND RECORDING MACHINE.
APPLICATION FILED MAR. 25, 1904.
6 SHEETS—SHEET 5.
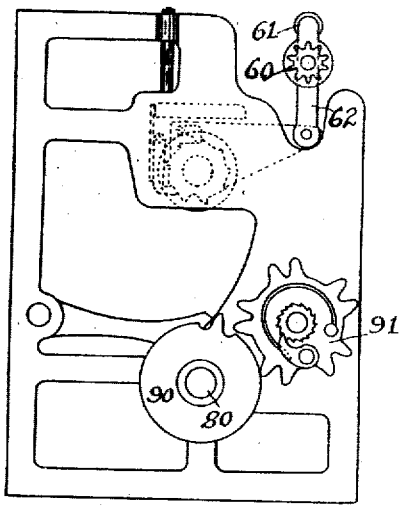
Fig. 11.
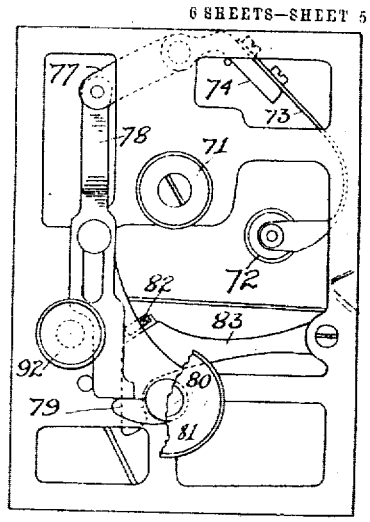
Fig. 12.
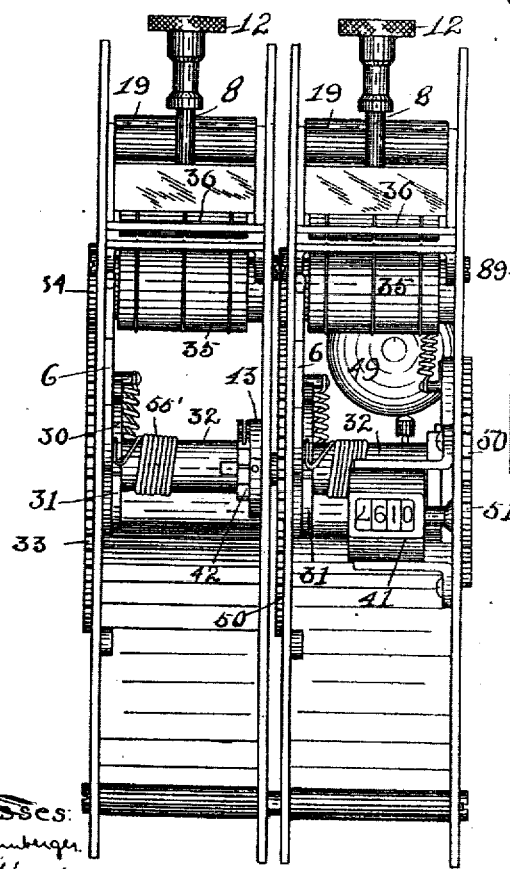
Fig. 14.
Fig. 13.
Witnesses:
J. Fred Hemberger
C. M. Theobald
Jno. F. Ohmer
Elmer H. Bridenbaugh
Inventors
By R. J. McCarty
Attorney No. 779,557. PATENTED JAN. 10, 1905.
J. F. OHMER & E. H. BRIDENBAUGH.
TICKET ISSUING AND RECORDING MACHINE.
APPLICATION FILED MAR. 25, 1904.

6 SHEETS—SHEET 6.

Witnesses:
J. Fred Hemberger.
B. McCarty

Inventors
Jno. F. Ohmer
Elmer H. Bridenbaugh
By R. J. McCarty,
Attorney.

No. 779,557. Patented January 10, 1905.

UNITED STATES PATENT OFFICE.

JOHN F. OHMER AND ELMER H. BRIDENBAUGH, OF DAYTON, OHIO, ASSIGNORS TO THE OHMER FARE REGISTER CO., OF DAYTON, OHIO, A CORPORATION OF NEW YORK.

TICKET ISSUING AND RECORDING MACHINE.

SPECIFICATION forming part of Letters Patent No. 779,557, dated January 10, 1905.

Application filed March 25, 1904. Serial No. 199,978.

*To all whom it may concern:*

Be it known that we, JOHN F. OHMER and ELMER H. BRIDENBAUGH, citizens of the United States, residing at Dayton, in the county of Montgomery and State of Ohio, have invented certain new and useful Improvements in Ticket Issuing and Recording Machines; and we do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in recording and ticket-issuing machines for public conveyances where receipt tickets or transfers are given by conductors to passengers. The conveyances to which we refer are street-cars, traction-line cars, omnibuses, &c.; and the invention is designed to be used preferably worn upon the person of the conductor, but it may be also conveniently attached in fixed position to a counter or wall in close proximity to a ticket-seller at stations, or convenient places where tickets or transfers are sold. It is a common thing with street-car companies generally to issue transfers to passengers for continuing to ride upon another connecting line, and the only system known to us for issuing such transfers is by the hand, torn or taken from a pad which is usually carried in the hand or pocket of the conductor, and where tickets are issued to passengers for the purpose of a receipt for the denomination of fare paid by such passengers the same system prevails as that referred to for the issuing of transfers. Consequently the conductor may inadvertently tear off two or more tickets or transfers by reason of their sticking together, or if he be inclined he might tear off any number of them for the purpose of secretly transferring them to other conductors to be turned in to the company in lieu of cash collections, and thereby defraud the company.

In view of the above conditions the present invention comprises mechanism by means of which a single ticket or transfer at a time may be issued; mechanism by means of which a record is made of each ticket or transfer issued; mechanism by means of which a printed record may be taken to show the number of tickets or transfers issued for any given period of time; mechanism for registering separately each class of tickets or transfers or for making a record of all classes on one set of counting mechanism; mechanism for perforating the tickets at different places as they are issued, as hereinafter set forth in the specification and pointed out in the claims.

The printing device is an improvement to some extent of that shown and described in patent to John F. Ohmer, No. 646,757, dated April 3, 1900. It may be here stated that the printing device has nothing whatever to do with the tickets or transfers issued from the machine, but is simply employed as a means for taking statements from the machine at given periods to show the number of tickets or transfers issued, the time they were issued, and other data. The tickets used are previously printed and are consecutively numbered when placed in the machine.

Preceding a detailed description of the invention reference is made to the accompanying drawings, of which—

Figure 2:
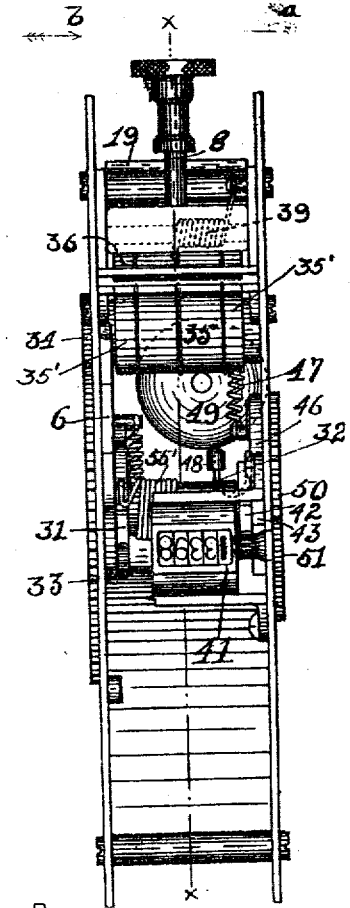
Figure 6:
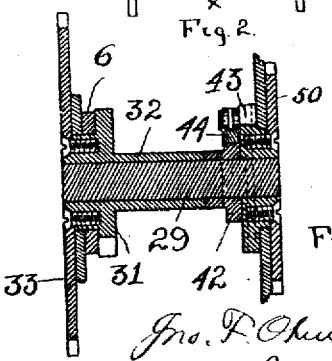
Figures 3, 4, 18:
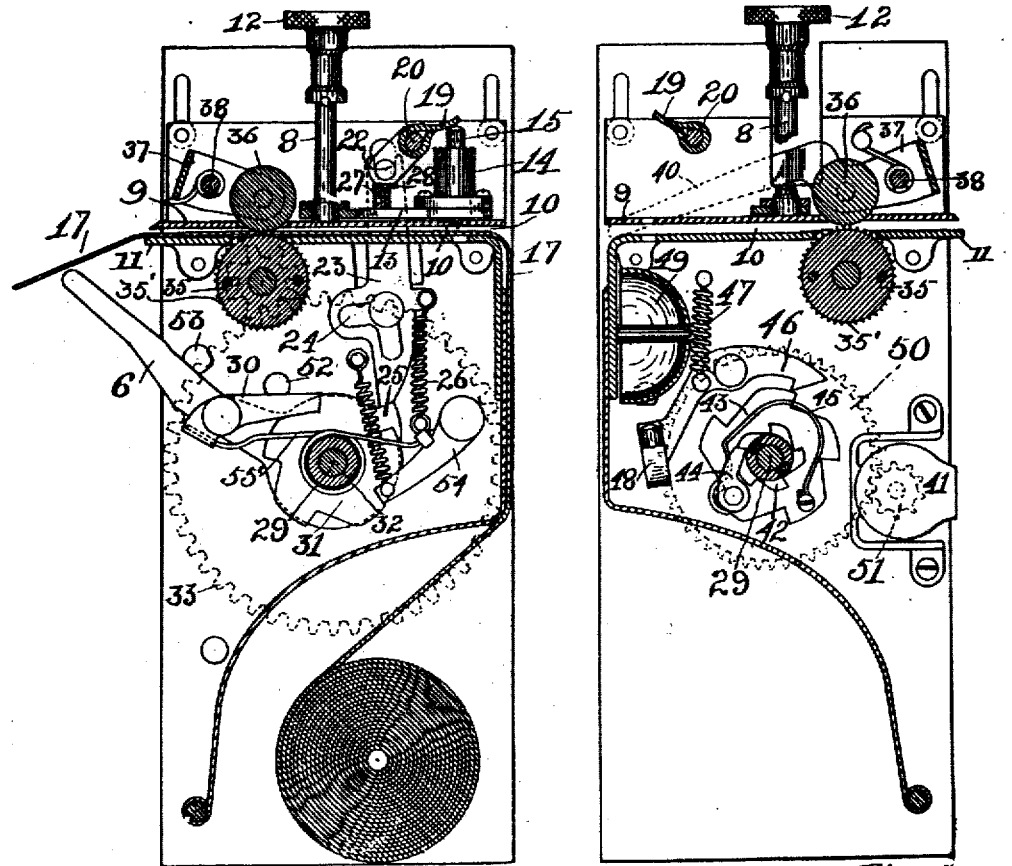
Figure 5:
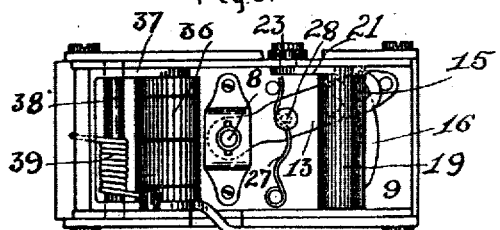
Figure 17:
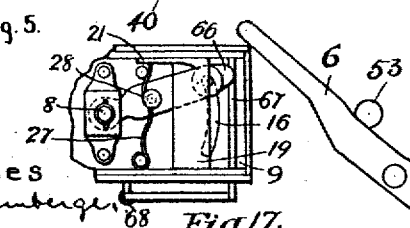
Figure 7:
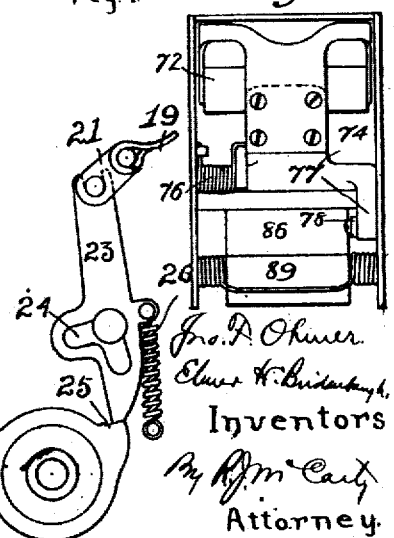
Figure 6:
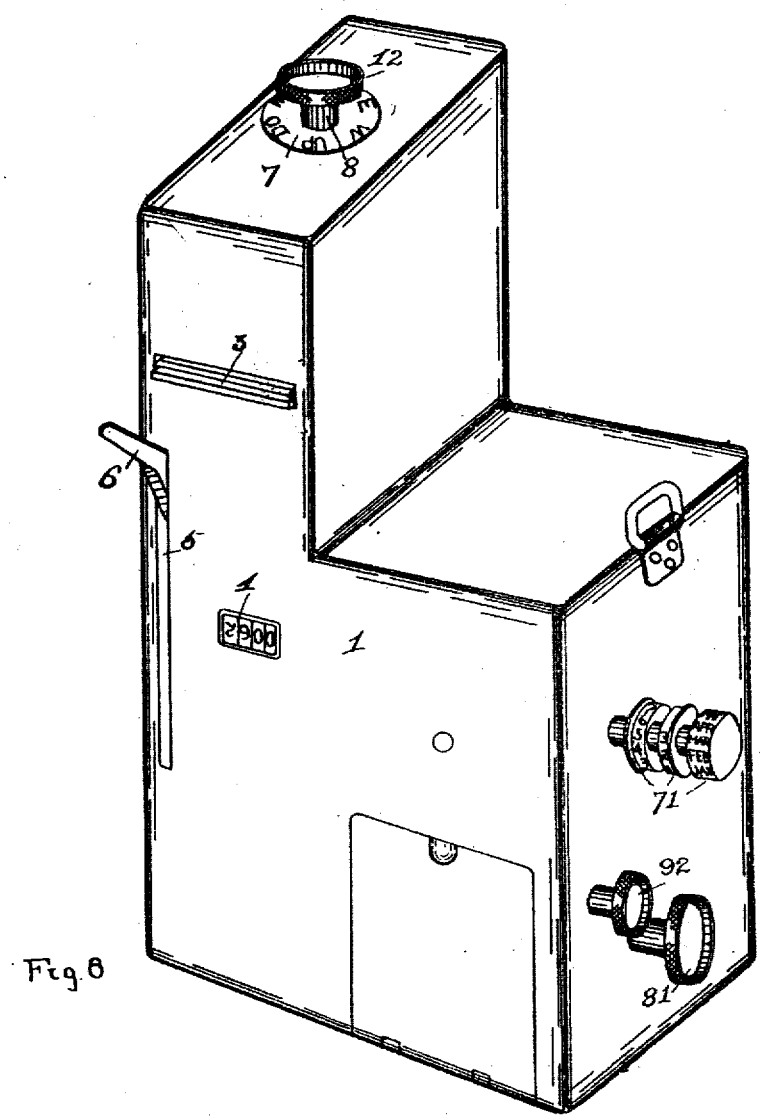
Figure 19:
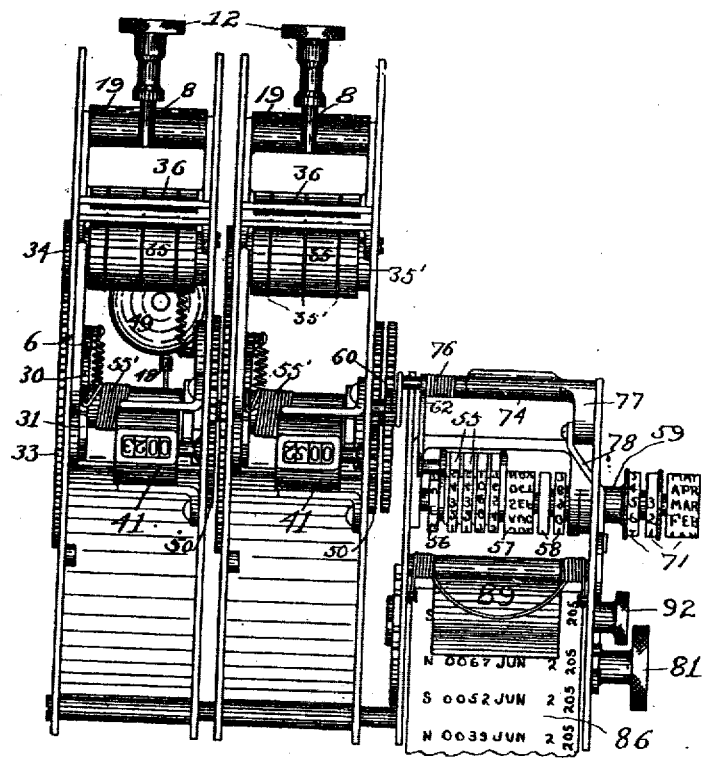

Figure 1 is a perspective view of the casing inclosing a single ticket issuing and recording device. Fig. 2 is a front elevation of the device removed from the casing as shown in Fig. 1. Fig. 3 is a sectional elevation taken on the line *x x* of Fig. 2 looking in the direction of arrow *a*. Fig. 4 is a similar sectional elevation looking in the direction of arrow *b*. Fig. 5 is a top plan view of Fig. 2. Fig. 6, Sheet 1, is a detail sectional view of the main shaft and the mechanism thereon. Fig. 7, Sheet 2, is a detail view of the operating-lever and the devices for actuating the perforator. Fig. 8 is a perspective view of the casing inclosing a single issuing and recording device as shown in Fig. 1 and printing devices for taking statements from the machine. Fig. 9 is a front elevation of the mechanism contained in the casing as shown in Fig. 8. Fig. 10 is a detail view of the mechanism which operates the direction-printing wheel of the printing devices. Figs. 11 and 12 are opposite side elevations of the printing mechanism and supporting-frame. Fig. 13 is a vertical section of the printing mechanism. Fig. 14 is a front elevation of two ticket issuing and recording devices assembled together minus the printing devices. Fig. 15 is a view of one form of consecutively-numbered tickets. Fig. 16 is a detail of the locks for the operating-levers where more than one ticket issuing and recording device is used. Fig. 17 is a detail plan view of parts shown in Fig. 10. Fig. 18 is a plan view of parts shown in Fig. 12. Fig. 19 is a front elevation of our invention, the same showing a series of separate issuing devices, a series of counting-wheels for each of said issuing devices, and a single series of total-counting wheels common to all of the issuing devices.

In a detail description of the invention similar reference characters indicate corresponding parts.

Referring to Figs. 1 and 2 of the drawings, the mechanism shown therein constitutes a single ticket or transfer issuing and recording device which is designed to issue and record consecutively numbered tickets or transfers from a continuous ribbon and to visibly indicate the total tickets or transfers issued and recorded for any given period of time. The devices shown in Fig. 14 comprise two of such ticket or transfer issuing and recording devices assembled in one casing and designed to issue and record from separate continuous ribbons of consecutively-numbered tickets or transfers. It is obvious that a further assembling of these devices may be obtained by multiplying the devices shown in Figs. 1 and 2 and placing them in a single casing to be conveniently carried upon the person of the conductor or fare-collector. It will also be obvious that when two or more of said devices are assembled one total visible counter may be employed to visibly indicate the totals of all the tickets or transfers issued and recorded in each device, or a separate visible counter may be employed for each device. It may be stated, however, that in the use of consecutively-numbered tickets or transfers from a continuous ribbon a single visible counter may be utilized to indicate the totals of all the transfers or tickets issued from the entire machine.

In describing the mechanism set forth in Figs. 1 and 2 it may be stated that this mechanism is in the main duplicated or multiplied in assembling more than one ticket or transfer issuing and recording device. Therefore a description which comprehends the mechanism shown in these figures will suffice for the invention illustrated in the remaining views of the drawings, with some exceptions or additions that will be referred to hereinafter.

The casing 1, as shown in Fig. 1, is of suitable size to accommodate the mechanism shown in Fig. 2 and has upon each side thereof a buckle 2 for the attachment of a suitable strap to be carried around the neck of the person operating the machine. The front of the casing is provided with a ticket or transfer issuing slot 3, through which each ticket or transfer issued and recorded is projected in a position to be torn off against the upper edge of said opening. 4 designates an opening in the front of the casing, through which is exhibited the total-counters, which record and indicate the total tickets or transfers issued for any given period. 5 designates a vertical oblong slot through which the end of the operating-lever 6 projects in a position to be conveniently operated. The top of the casing is provided with a dial 7, with letters or other indications thereon denoting the direction of each trip of the car or other conveyance. Through the center of said dial there is projected a shaft 8, which turns on a pivot at its lower end on a plate 9, said plate forming the upper inclosure of a passage 10, through which the ribbon of tickets or transfers is passed. A plate 11 forms the lower inclosure of this passage. (See Figs. 3 and 4.) The upper portion of the shaft 8 has a button 12, by means of which it is turned in part of a circle in two directions, as indicated upon the dial 7. There is suitable means on the button 12 to enable the shaft to be turned to the right position, as indicated on said dial. Upon the lower end of said shaft there is carried a horizontal arm 13, the outer end of which has a tubular post 14, which supports a pin or perforator 15, the lower end of said perforator being pointed. The said perforator moves in a curved opening 16 in the plate 9 and is adapted to be lowered to perforate each ticket, while the ribbon 17 lies in the passage 10. The arm arm 13 is moved in either direction from the button 12. Each ticket or transfer is provided with the words "Up," "Down," "East," "West," "North," "South" to indicate the direction of the passage for which the ticket is sold. The ticket, as shown in Fig. 15 of the drawings, has the words "Up" and "Down" thereon and the word "Down" has been perforated at 18 by the pointed end of the perforator 15, said perforator having been first moved and such movement having been governed by the dial 7. If the perforator 15 is to be moved to a position to perforate the word "Up" as shown upon said ticket, it would be moved to the other extremity of the slot 16, and the movement would be governed by the word "Up" as appearing on the dial 7. Bearing upon the upper end of the perforator 15 there is projected a lip 19, which is mounted upon a shaft 20, which has its ends journaled in the sides of the frame. Projecting from one end of said shaft 20 there is a crank-arm 21, which has connected to it a crank-pin 22, working in a suitable opening in the frame and connected with a pitman 23. This pitman is connected to the side of the frame by means of a headed guide-pin, which enters an angular slot 24 in said pitman. The pitman is maintained in operative relation with a cam 25 by means of a spring 26. The cam 25 is on the head of the operating-lever 6. (See Figs. 3 and 7.) When said pitman is in its normal position, as in Fig. 3, the lip 19 exerts no pressure on the perforator 15; but it is clear that when the lever 6 is depressed from the position shown in said figure the lip 19 will lower against the top of said perforator and will depress said perforator and perforate the portion of the ticket hereinbefore referred to. The position of the arm 13 is secured during the operation of perforating the ticket or transfer by a spring 27, which presses upon a pin 28 and is secured at one end to the plate 9. (See Fig. 5.) The operating-lever 6 is loose upon the main shaft 29 and carries a ratchet-pawl 30, which engages in the upper movement of said lever a ratchet-wheel 31, the latter being connected with a sleeve 32, which is loose upon said shaft. Said operating-lever is mounted upon the hub of said ratchet-wheel 31. (See Fig. 6.)

33 is a spur-wheel lying on the outer side of the frame and having a fixed connection with the ratchet-wheel 31. Said spur-wheel 33 meshes with a pinion 34 above, which is fixed to the shaft of the primary feed-roller 35. This feed-roller is constructed of a suitable number of drums, with intervening saw-toothed disks 35', the whole being rigidly united upon a common shaft and the toothed edges of the disks 35' being made to project slightly beyond the circumference of the drums. By this construction of the primary feed-roller a positive and accurate feed of the ticket or transfer ribbon is at all times certain. Said ribbon is maintained in contact with said primary feed-roller by a smaller feed-roller 36, which has a suitable number of circumferential grooves which are in alinement with the toothed disks, so that the ribbon will be engaged by the feed-rollers. The upper feed-roller 36 is mounted upon a frame 37, which is hinged upon a shaft 38, the latter having a spring 39 coiled about it which is instrumental in holding the frame 37 downward in a position which maintains the roller 36 in proper relative position with the lower feed-roller. One side of the frame 37 has an arm 40, (see Fig. 4,) by means of which the roller and frame may be raised to permit of the passage of the end of the ribbon through said rollers and in a position to be acted upon by said rollers in preparing the machine for use.

A consecutive visible counter 41, upon which is recorded all of the tickets or transfers issued, is operated simultaneously with each issuing of the tickets or transfers, consisting as follows: 42 is a smaller ratchet-wheel connected to sleeve 32, and therefore movable with the ratchet-wheel 31 on the other end of said sleeve. (See Fig. 6.) 43 is an adjacent ratchet-wheel fixed to the shaft 29 and movable from the smaller ratchet-wheel 42 through a pawl 44, the latter being carried on the ratchet-wheel 43 and maintained in engagement with the smaller ratchet-wheel 42 by means of a spring 45. (See Fig. 4.) In the rotation of the ratchet-wheel 43 the pawl 46 is tripped, said pawl having a spring connection 47 and carrying on one end a bell-hammer 48, which strikes bell 49, thus giving an auricular indication of each operation of issuing and recording a ticket or transfer. 50 designates a transmission-gear which is fixed to the ratchet-wheel 43 and conveys motion to the visual counting-wheels in casing 41 through a pinion 51, which is on the shaft of said counters. In the feeding of a ribbon of printed tickets consecutively numbered it is obvious that each feed must be accurate in order that uniform lengths of tickets may be fed from the machine upon each operation. It is therefore important that at the limit of each feeding operation of the primary feed-roller said roller be stopped positively and not allowed to have any momentum after the limit of its feeding movement. In accomplishing this it is important that the ratchet-wheel 31 be effectually controlled from any over movement in the feeding operation and from any backward movement. The pawl 30 at the limit of its operation engages a stop or pin 52, which projects from a convenient portion of the frame, and thus said pin locks the pawl in a fixed position with the ratchet-wheel. At the same time the operating-lever 6 stops against a similar pin 53, and the two members become fixed in their relation with the ratchet-wheel 31, and the latter becomes firmly locked against the slightest possible overthrow. A retaining-pawl 54 engages said ratchet-wheel at the rear and prevents any possible backward movement thereof. A double-acting spring 55' exerts pressure upon both the pawls 30 and 54 to maintain them in contact with said ratchet-wheel. Said spring is coiled around the sleeve 32 and is instrumental in moving the operating-lever 6 to its upper position after said lever has been moved downwardly to the lower limit of the slot 5. The lower portion of the casing is provided with a suitable compartment for holding the ribbon of tickets, which may be in the form of a continuous roll or in the form of a package folded back and forth.

We have thus far described the mechanism for issuing and recording consecutively-numbered tickets or transfers from a continuous ribbon which are limited to one particular class of tickets or a single company. In cases where it is necessary to issue tickets good for more than one particular line or company or tickets of different classes the ticket issuing and recording device described is multiplied to the desired extent and assembled in one casing the desired number of such devices.

Whether the machine comprises a single ticket issuing and recording device or more than a single device our invention further consists of means for obtaining printed statements of the number of tickets or transfers issued from one or more machines or devices and the direction of such tickets or transfers and will also give the number of each machine from which tickets or transfers were issued. In other words, if there is more than one issuing and recording device employed the printed statement will show the total of all the tickets issued from the machine, as a whole. When the printing attachment is utilized in connection with more than one issuing and recording device, it is preferable to use but a single set of visual counters; but it is possible to use a separate set of such counters for each device. These printed statements are obtained from a bank of counter printing-wheels 55, a direction-printing wheel 56, and month and date printing wheels 57 and 58, which are assembled upon a common shaft 59. (See Fig. 9.) The counter printing-wheels 55 are actuated upon each operation of issuing a ticket through a pinion 60, which meshes with a spur-wheel 50 and carries a crank-pin 61, which is connected to a pitman 62. The lower end of said pitman carries a pawl-support 63, loosely mounted upon shaft 59 of said counting-wheels and supporting a pawl 64, that engages a ratchet-wheel 65, fixed to the first wheel of the counter printing-wheels. The other counter printing-wheels are operated from this units-wheel in a well-known manner. The printing-wheel 56, from which is printed the direction of travel for which the ticket is sold, is operated from the shaft 8, which has hereinbefore been referred to in connection with the perforation of said tickets, and is operated as follows, (see Fig. 10:) The perforator-support 14 is provided with a projection 66, which in the lateral movements of said support 14 engages a cam-bar 67 to depress said bar in the movement of said support in one direction and to permit said cam-bar to rise in the movement of said support in the other direction. (See Figs. 10 and 17.) Rigidly connected to one end of this cam-bar 67 is a rod 68, having its lower end 69 detachably connected with the printing-wheels 56. Upon the periphery of this printing-wheel are placed the letters corresponding with the dial 7 and indicating the direction. The connection of the rod 69 may be shifted to suitable points to cause the proper direction on the wheel to move to a printing position. The rod 68 is maintained upward by a coil-spring 70, and in this position one direction—for example, "South"—will be in a printing position on said wheel, and in the other or lower position of said rod the opposite direction—for example, "North"—will be in a printing position.

The printing-wheels 57 and 58, which print the date upon each statement, are mounted upon telescopic shafts which have on their outer ends finger-wheels 71, which bear the months and the dates thereof corresponding with the letters and figures on the wheels 57 and 58, so that each of these wheels is independently turned to a position to bring the proper printing position month and date in proper printing position relatively to the counter printing-wheels 55 and the direction-printing wheel 56. The printing mechanisms, which include the printing-wheels on shaft 59, and the inking devices are mounted upon a separate frame, as shown in Figs. 11 and 12, which is attachable to one side of the frame which supports the issuing and recording mechanism. The printing-wheels are inked by inking-roller 72, which is movable across the lower face of said wheels preparatory to each impression. Said roller is mounted upon the lower ends of spring-arms 73, attached to a support 74, that is loosely mounted upon a shaft 75. The inking-roller 72 is maintained away from the wheels, as shown in Fig. 13, by a coil-spring 76, one end of which is secured to the frame, and the other end projects under the rearward portion of the support 74, (see Figs. 9, 12, and 18,) and, further, the support 74 has a crank-arm 77 projecting therefrom, which is connected to a pitman 78, said pitman having a slot-and-pin connection which maintains it in position. (See Fig. 12.) The lower end of said pitman lies above a cam 79 on a shaft 80, said shaft having a finger-wheel 81, lying on the outside of the casing, by means of which it is turned to first bring the cam 79 in contact with said pitman, and to thus cause said pitman to rise, at which time the inking-roller 72 is moved over the face of the printing-wheels. At the termination of this operation the platen 82 is moved up to press the ribbon of paper 86 against the inked wheels. Said platen is supported on arms 83, that are loosely mounted upon a shaft 84, there being one of these arms 83 at each end of said shaft, and beneath said arms there are cams 85, fixed upon shaft 80 in a position to come in contact with said arms after the cam 79 has performed its operation. The ribbon of paper upon which the statements are taken is fed from a continuous roll 87, suitably housed in the lower portion of the frame and passed over a feed-roller 88, against which it is held by a spring-pressed plate 89. Upon the shaft 80 there is a single-tooth wheel 90, that engages with a mutilated gear-wheel 91 on the shaft of the feed-roller 88, and in each turn of the finger-wheel 81 the ribbon of paper is suitably spaced for each impression to be made thereon from the printing-wheels. When it is desired to detach a printed statement from the ribbon, the finger-wheel 92 on the shaft of the feed-roller 88 is turned to feed said ribbon out of the machine. (See Fig. 13.) In cases where more than one issuing and recording device is used a series of lever-locks 93 are employed to prevent an operation of more than one lever 6 at a time. These locks are shown in dotted positions in Fig. 16 in the rear of the front of the casing and consist of plates which are pivoted at their lower ends. In the depression of any one of the levers 6 the plates are caused to move over the lower ends of the lever-slots 5, and thus prevent more than one lever being operated at a time. The two outermost ones of said locking-plates 93 are provided with stops, which prevent them from moving too far in the outward direction.

When more than one issuing and recording device is used, the consecutive numbering of the tickets or transfers issued from each device makes it unnecessary to employ more than a single counter, for the reason that the consecutive numbers on the tickets or transfers afford means for ascertaining how many have been issued from each device. For example, with a machine containing two or more rolls or folds of consecutively-numbered tickets or transfers and having an issuing device for each roll a single counter will serve to record the totals of all the tickets or transfers issued from the entire series of issuing devices. If there be issued from one class of tickets or transfers fifty tickets and from another special class of tickets or transfers twenty-five tickets or transfers and the serial consecutive number in each class begins with No. 1, the counter which is common to all will show that seventy-five tickets or transfers have been issued from the entire machine, and the first consecutive number showing the last tickets or transfers issued will exhibit 51 and 26, respectively, which will indicate that fifty in one particular class has been issued and twenty-five in the other particular class, or seventy-five combined, as will be shown by the counter. If from a third special class twenty tickets or transfers are issued, the total-counter will show that ninety-five have been issued and the third roll will show by the consecutive numbers that the first ticket next to the last one issued would be numbered "25" (assuming that this roll of tickets or transfers began with No. 1) and consequently twenty in this particular class were issued. In practical operation it is only necessary at the beginning of a run to observe the total-counter numbers and the consecutive numbers of each class of tickets or transfers, or if the visible counter is omitted and the total-printing counter is combined in the machine it will be then necessary to make a record of the consecutive numbers for the beginning of each special class of tickets or transfers and to take a printed record from the total-printing counters at the beginning of the run, and for the finish of each half-trip or for any intermittent period of time, when an impression is taken from the total-printing counters, the total number of tickets or transfers issued in all the classes can by comparison be determined at the finish of a run or a day's work for each conductor. The responsibility for all the tickets issued in their respective classes can be determined by calculating the opening and closing consecutive numbers in each specific class and comparing the total of all to the total number shown at the counter, which comprises a part of the invention, for the purposes named. It is obvious that the total number of the several kinds of tickets or transfers issued may be determined by computing from the consecutive numbers of the tickets or transfers only. If we are limited to computing from the consecutive numbers only, it will be possible for a conductor during the time he was engaged in service to take from the machine one or more rolls or folds of consecutively-numbered tickets or transfers and secretly substitute for a time rolls or folds, in which case there would be a discrepancy between the total-counter and the number of tickets issued as computed from the consecutive numbers in all the rolls of tickets or transfers used.

Having described our invention, we claim—

1. In a ticket issuing and recording machine, a casing having suitable space for a continuous ribbon of tickets or transfers, means for issuing said tickets or transfers, and means for perforating each ticket or transfer issued at different points thereof to indicate the direction.

2. In a ticket issuing and recording machine, a casing having suitable space for a continuous ribbon of tickets or transfers, means for issuing said tickets or transfers, means for perforating each ticket or transfer issued at different points thereof to indicate the direction, a total consecutive counting device to record the totals of the tickets or transfers issued, and means connected with the issuing devices for operating the counting device.

3. In a ticket issuing and recording machine, means for feeding tickets or transfers from a continuous ribbon, and means for perforating at different points the direction indicated upon each ticket or transfer prior to each issuance.

4. In a ticket issuing and recording machine, a primary feed-roll consisting of a cylindrical surface with toothed or serrated disks at suitable points, an upper feed-roll having a matching circumference, a perforator adapted to punch the direction indicated upon said tickets or transfers, an operating-lever acting upon said perforator in its downward movement to perforate the ticket or transfer, and acting upon the primary feed-roller in its upper movement to feed the tickets or transfers.

5. In a ticket issuing and recording machine, a primary feed-roller, means for perforating the tickets prior to each issuance, an operating-lever acting upon the perforating mechanism in the initial stroke of said lever, and acting upon the feeding mechanism in the final movement thereof and means for shifting said perforating mechanism laterally.

6. In a ticket issuing and recording machine, the combination with a casing adapted to contain a continuous ribbon of tickets or transfers, issuing mechanism to feed said tickets or transfers a perforator to punch said tickets or transfers, an operating-lever acting upon said perforator in its initial stroke, and acting upon the issuing mechanism in its final movement, a counter to register each ticket or transfer issued, and printing devices for taking statements showing the number of tickets or transfers issued and the day and month upon which the statement is taken.

7. In a ticket issuing and recording machine, a casing having suitable space to contain an endless ribbon of transfers or tickets, means for feeding said transfers or tickets, a perforator, means for moving said perforator laterally, and printing devices for taking statements showing the work of the machine for any given period.

8. In a ticket issuing and recording machine, a primary feeding-roller, an operating-lever, means between said lever and said feed-roller for imparting intermittent movement to said roller, stop devices to positively stop said feed-roller at the termination of its feeding movements, a consecutive counter, means interposed between said counter and said lever for operating the counter in each feeding operation, a series of counter printing-wheels, means between said counter printing-wheels and said lever whereby said wheels are moved during each movement of said lever, and a direction-printing wheel also operated from said lever.

9. In a ticket issuing and recording machine, feeding-rollers, a perforating device, a main operating-lever, and means interposed between said lever and said perforating device for actuating said device in one movement of the lever, and means interposed between said lever and said feed-roll for actuating the feed-roll in the other movement of said lever.

10. In a ticket issuing and recording machine, a series of ticket-issuing devices each of which is designed to issue a separate class of tickets or transfers from continuous ribbons of consecutively-numbered tickets or transfers, a single total-counter to record the tickets or transfers of all of said devices, means for perforating the direction upon each ticket or transfer, counter printing-wheels actuated from either of said devices to record the total tickets or transfers, a direction-printing wheel, and means interposed between said direction-printing wheel and the means for perforating the direction upon the tickets or transfers, and whereby said direction-printing wheel is moved to a position to print said direction.

11. In a ticket issuing and recording machine, a series of separate issuing devices each of which issues from a continuous roll of ticket or transfer ribbons, a series of counting-wheels for each of said ticket-issuing devices, and a series of total-counting wheels common to all of said issuing devices.

12. In a ticket issuing and recording machine, a primary feeding-roller, an operating-lever, means interposed between said lever and said feed-roller for imparting intermittent movement to said roller, stop devices adapted to positively stop said feed-roller at the termination of its feeding movement.

13. In a ticket issuing and recording machine, a primary feeding-roller, an operating-lever, means interposed between said lever and said feed-roller for imparting intermittent movement to said roller, and a direction-printing wheel also operated from said lever.

14. In a ticket-issuing machine, a casing having a suitable space for a supply of tickets in the form of a continuous strip, means for issuing said tickets, and a movable perforator adapted to be set to different positions to punch said tickets at different places as they are issued.

In testimony whereof we affix our signatures in presence of two witnesses.

JOHN F. OHMER.
ELMER H. BRIDENBAUGH.

Witnesses:
R. J. McCARTY,
JOHN W. McKEOWN.